2,775,515

METHOD OF COLORED CLOUDS BY EXPLOSIVE DISPERSION

Sidney J. Magram, Baltimore, Md., assignor to the United States of America as represented by the Secretary of the Army No Drawing. Application December 10, 1953, Serial No. 397,492

4 Claims. (Cl. 52—23)

(Granted under Title 35, U. S. Code (1952), sec. 266)

The invention described herein may be manufactured and used by or for the Government of the United States of America for governmental purposes without the payment to me of any royalty thereon.

This invention relates to the production of airborne suspensions of coloring materials in the form of clouds or smokes.

Objects of the invention include the preparation of a composition in the form of a powder which is readily dispersible by explosives or propellants to produce a colored cloud; the production of colored smoke bursts wherein the quantity of colored material per unit munition is decreased without commensurate loss of color intensity.

The production of colored clouds or colored smoke by creating airborne dispersions of coloring materials or dyes is known to the art. While some have considerable value in the field of munitions and pyrotechnics, present methods of dispersion require the use of relatively large quantities of the coloring agents.

I have discovered that the amount of coloring material or dye used per unit munition can be substantially decreased, without loss of effective color intensity of the clouds produced if the agent is suitably disseminated throughout the particles of a finely divided inert medium which acts as a dispersing agent therefor.

Suitable for my purpose are finely divided powders composed of inert materials hereinafter described. Among the materials which I have found to be suitable are various silica powders which may be obtained on the market, such for example as silica gel powder, finely powdered forms of silica dioxide, silica aerogel, titanium dioxide and aluminum oxide.

I have found that the silica aerogel which is marketed under the commercial name of Santocel is well adapted to my purpose. This product which is predominately composed of silica dioxide is obtainable in the form of a substantially white transparent powder in a fine state of subdivision. Also I have found that the amorphous silica which is commercially available under the proprietary name of Silica Gel is suitable for my purpose.

Any of a number of known dyes may be used as the coloring material. The dye may be one which exhibits color by virtue of absorbing visible light in a given range, the non-absorbed color constituting the characteristic color of the dye. Optionally, the dye may be a fluorescent material which absorbs ultra violet light and converts it into light in the visible range and of desired color. Whereas the coloring materials may be used singly, I also contemplate the employment of mixtures thereof, and I have found that the conjoint use of fluorescent material with non-fluorescent dye in some cases is desirable. Among the materials which I prefer I have found 1-methylaminoanthraquinone, auramine and Rhodamine B to be eminently suitable.

Whereas the coloring material may be incorporated in dry form into the inert powder by mechanical processing, as by commingling in a ball mill, I prefer to employ an incorporating vehicle for the dye in the nature of a volatile solvent. The solvent should be one capable of taking up the coloring agent in appropriate quantity, and should be relatively inert, i. e., it should be substantially non-reactive with the coloring material and with the powdered agent, or if reactive should not produce products that would interfere with or detract from the objects of the invention. Among the solvents that may be used, acetone and benzene have been found of good value. Where a water soluble or water dispersible dye is used, water may be used as the vehicle of incorporation. Mixtures of various solvents are in some cases desirable and I have found that good results in some cases may be obtained by dissolving the dye in a suitable non-volatile liquid and then adding a larger amount of a volatile liquid. Where the conditions predispose, the dye may be deposited from solution on the inert agent in the form of extremely small crystals.

It is an object of my invention that the amount of dye incorporated with the finely divided agent should be small. As a rule I prefer to incorporate a proportion of dye in an amount not much higher than 10%, and I have obtained operative results by incorporating same in an amount as low as 0.5% but usually not substantially lower than 0.5%. The limits in any particular case within the purview of my invention will depend upon the nature of the particular coloring material and dispersing agent involved.

As illustrative of my invention, the folowing examples are submitted:

Example I

| | Percent by weight |
|---|---|
| Santocel | 90 |
| 1-methylaminoanthraquinone | 10 |

The 1-methylaminoanthraquinone is dissolved in benzene and then mixed with the Santocel, the solvent is allowed to evaporate with occasional stirring of the mixture.

Example II

The material is prepared as in Example I except that acetone is used in place of benzene.

Example III

| | Percent by weight |
|---|---|
| Santocel | 95 |
| Auramine | 5 |

Auramine is dissolved by water. The solution is then mixed with Santocel and the water evaporated by stirring.

Example IV

The same procedure is followed as in Example III except that Rhodamine B, a red water solvent dye, is used in place of auramine.

Example V

| | Percent by weight |
|---|---|
| Silica | 99.5 |
| 1-methylaminoanthraquinone | 0.5 |

The same procedure is followed as in the foregoing examples.

I claim:

1. A method of producing a colored cloud by explosive dispersion which comprises detonating a missile containing an explosive dispersant and a finely divided inert powder of the group consisting of silica gel, titanium dioxide and aluminum oxide coated with a coloring material of the group consisting of 1-methylamino-anthraquinone, auramine and Rhodamine B, the inert powder, coloring material composition containing from 10% to 0.5% of the coloring material and from 90% to 99.5% of the inert powder.

2. A method according to claim 1 in which the coloring material is 1-methylamino-anthraquinone and the inert powder is silica gel.

3. A method according to claim 1 in which the coloring material is auramine and the inert powder is silica gel.

4. A method according to claim 1 in which the coloring material is Rhodamine B and the inert powder is silica gel.

References Cited in the file of this patent

UNITED STATES PATENTS

| | | |
|---|---|---|
| 666,302 | Collins | Jan. 22, 1901 |
| 2,007,980 | Neumann | July 16, 1935 |
| 2,052,626 | Houghton | Sept. 1, 1936 |
| 2,068,877 | Spence et al. | Jan. 26, 1937 |
| 2,423,859 | Van Karner | July 15, 1947 |
| 2,452,616 | Wainer et al. | Nov. 2, 1948 |
| 2,626,255 | Barnett | Jan. 20, 1953 |

OTHER REFERENCES

Jennison: The Manufacture of Lake Pigments, 1920, Div. 56.

Zern and Rubencamp: A Treatise on Colour Manufacture, Div. 56, 1908.

Shureliff, abstract of application 531,113, Pub. in O. G. Aug. 5, 1952, vol. 661, page 305.

Chemical and Engineering News, "Colored Signal Smokes," Nov. 25, 1944, pp. 1990, 1991 and 2056. (Copy in Scientific Library.)